United States Patent
Gupta et al.

(10) Patent No.: US 7,568,035 B2
(45) Date of Patent: Jul. 28, 2009

(54) COMMAND BINDING DETERMINATION AND IMPLEMENTATION

(75) Inventors: Namita Gupta, Seattle, WA (US); Michael J. Hillberg, Beaux Arts, WA (US); Jeffrey L. Bogdan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 749 days.

(21) Appl. No.: 11/215,575

(22) Filed: Aug. 30, 2005

(65) Prior Publication Data

US 2007/0050469 A1    Mar. 1, 2007

(51) Int. Cl.
*G06F 15/16* (2006.01)
(52) U.S. Cl. .................. 709/226; 709/217; 710/67; 710/62; 710/65; 710/72; 719/316; 719/331; 719/332; 719/310
(58) Field of Classification Search ............... 709/226, 709/227; 719/310
See application file for complete search history.

(56) References Cited

U.S. PATENT DOCUMENTS

| 5,761,656 | A | 6/1998 | Ben-Shachar |
| 7,386,856 | B2 * | 6/2008 | Need et al. ........... 719/310 |
| 2004/0111692 | A1 | 6/2004 | Bowyer et al. |
| 2005/0108735 | A1 * | 5/2005 | Need et al. ........... 719/331 |

FOREIGN PATENT DOCUMENTS

| JP | 15-216529 A | 7/2003 |
| JP | 16-334332 A | 11/2004 |

* cited by examiner

*Primary Examiner*—Jude J Jean Gilles
(74) *Attorney, Agent, or Firm*—Workman Nydegger (57) ABSTRACT

Aspects of the subject matter described herein relate to generating and propagating commands. In aspects, elements of a graphical user interface may include an input binding which associates a gesture with a command. When a gesture is received, the command is generated depending on which element has focus. In addition, elements of the graphic user interface may also define methods to call when commands are received. When an event or a command is received, a hierarchical data structure of elements representable on the graphical user interface may be traversed to respond to the event or command.

20 Claims, 10 Drawing Sheets

COMMAND BINDING DETERMINATION AND IMPLEMENTATION

BACKGROUND

When a user opens an application, the user may have access to commands that allow the user to perform various functions in the application. For example, the user may be able to cut or copy text or other objects from the application and paste the text or other objects into another application.

These commands may be invoked in various ways. For example, a user may select a menu toolbar and navigate through menus to find a cut or copy command. As another example, a user may enter a shortcut key (e.g., [control]-x) to cut an object from an application. As yet another example, a user may select text with a mouse and drag the text to another location thus initiating a cut and a paste command.

With the variety of input devices and applications that may need to use commands, implementing and using a command architecture is becoming more complex. This complexity is increasing the work needed to be performed by application developers and others in developing programs that use commands.

SUMMARY

Briefly, aspects of the subject matter described herein relate to generating and propagating commands. In aspects, elements of a graphical user interface may include an input binding which associates a gesture with a command. When a gesture is received, the command is generated depending on which element has focus. In addition, elements of the graphic user interface may also define methods to call when commands are received. When an event or a command is received, a hierarchical data structure of elements representable on the graphical user interface may be traversed to respond to the event or command.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

BRIEF DESCRIPTION OF THE DRAWINGS

FIGS. 2A-6B are block diagrams generally representing exemplary application programming interfaces that may operate in accordance with aspects of the subject matter described herein;

DETAILED DESCRIPTION

Exemplary Operating Environment

Figure 1:
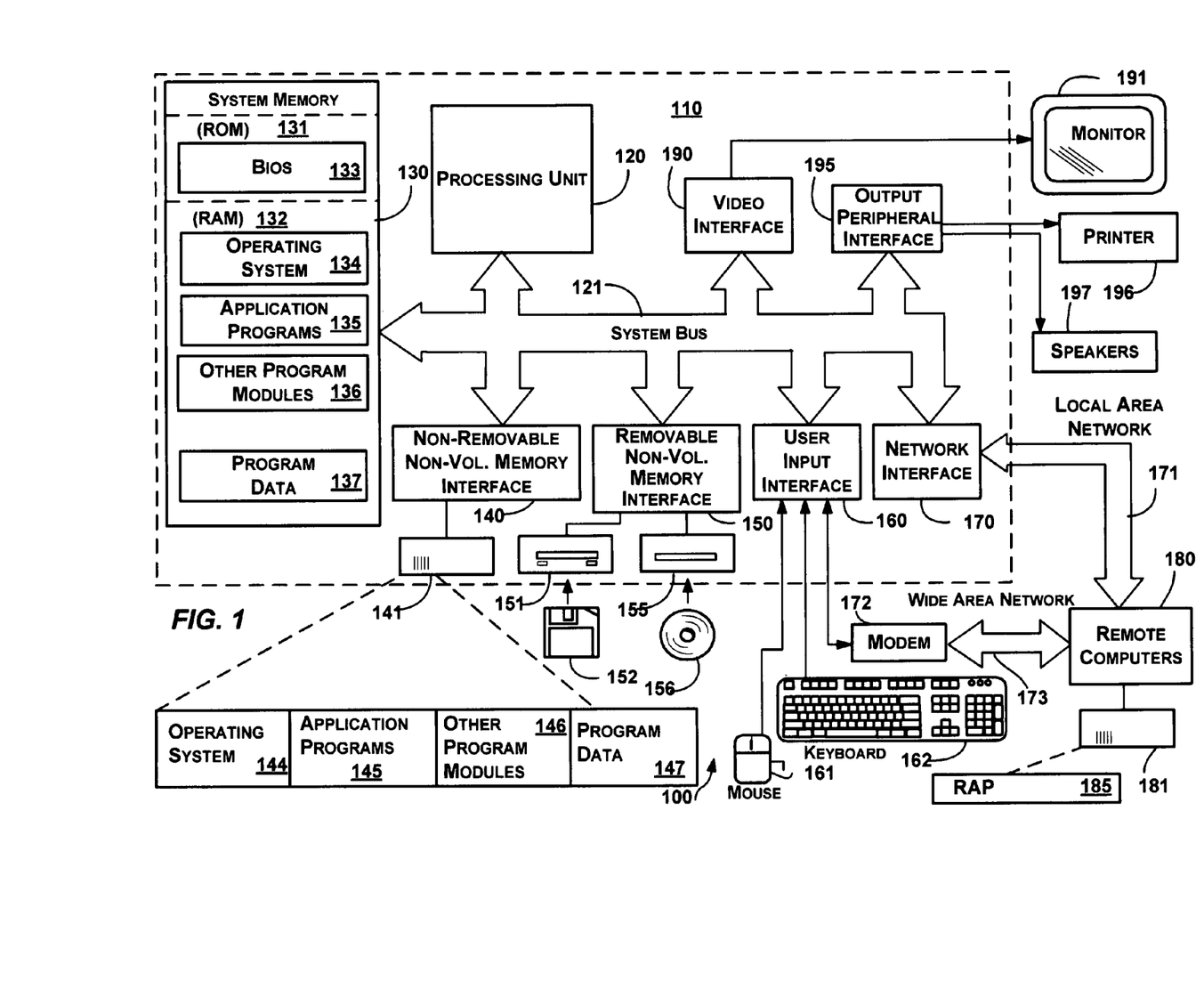
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Interfaces

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), and the like of a component of a system capable of communicative coupling to one or more mechanism(s), method(s), function call(s), module(s), and the like of other component(s). The term "segment of code" is intended to include one or more instructions or lines of code, and includes, for example, code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2A:
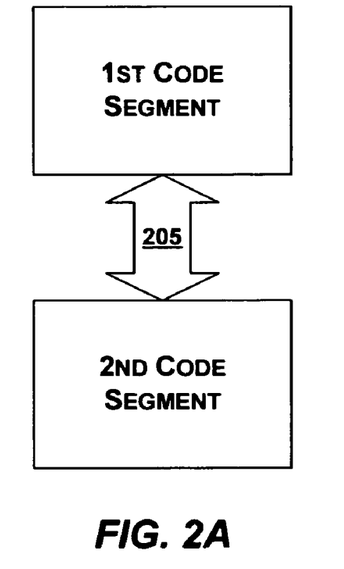
Figure 2B:
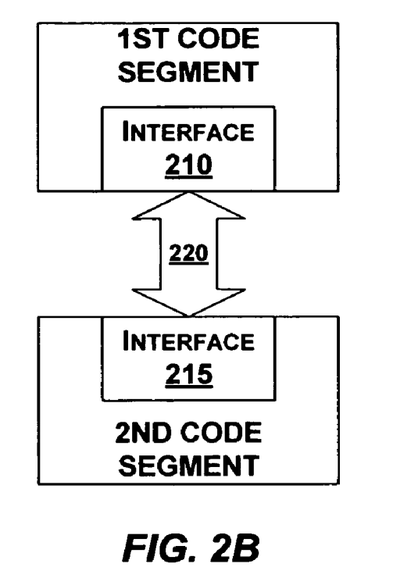

Notionally, a programming interface may be viewed generically, as shown in FIG. 2A or FIG. 2B. FIG. 2A illustrates an interface 205 as a conduit through which first and second code segments communicate. FIG. 2B illustrates an interface as comprising interface objects 210 and 215 (which may or may not be part of the first and second code segments), which enable first and second code segments of a system to communicate via medium 220. In the view of FIG. 2B, one may consider interface objects 210 and 215 as separate interfaces of the same system and one may also consider that objects 210 and 215 plus medium 220 comprise the interface. Although FIGS. 2A and 2B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing, and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc. separate from information flow between the code segments) or non-existent, as when one code segment simply accesses functionality performed by a second code segment. Any or all of these aspects may be important in a given situation, for example, depending on whether the code segments are part of a system in a loosely coupled or tightly coupled configuration, and so this list should be considered illustrative and non-limiting.

This notion of a programming interface is known to those skilled in the art and is clear from the foregoing detailed description. There are, however, other ways to implement a programming interface, and, unless expressly excluded, these too are intended to be encompassed by the claims set forth at the end of this specification. Such other ways may appear to be more sophisticated or complex than the simplistic view of FIGS. 2A and 2B, but they nonetheless perform a similar function to accomplish the same overall result. Below are some illustrative alternative implementations of a programming interface.

A. Factoring

Figure 3A:
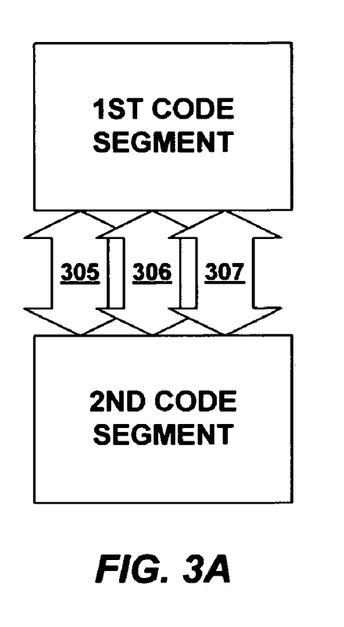

A communication from one code segment to another may be accomplished indirectly by breaking the communication into multiple discrete communications. This is depicted schematically in FIGS. 3A and 3B. As shown, some interfaces can be described in terms of divisible sets of functionality. Thus, the interface functionality of FIGS. 2A and 2B may be factored to achieve the same result, just as one may mathematically provide 24 as 2 times 2 times 3 times 2. Accordingly, as illustrated in FIG. 3A, the function provided by interface 205 may be subdivided to convert the communications of the interface into multiple interfaces 305, 306, 307, and so on while achieving the same result.

Figure 3B:
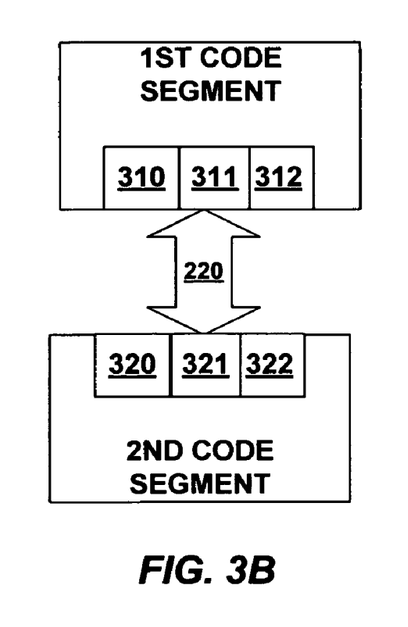

As illustrated in FIG. 3B, the function provided by interface 210 may be subdivided into multiple interfaces 310, 311, 312, and so forth while achieving the same result. Similarly, interface 215 of the second code segment which receives information from the first code segment may be factored into multiple interfaces 320, 321, 322, and so forth. When factoring, the number of interfaces included with the $1^{st}$ code segment need not match the number of interfaces included with the $2^{nd}$ code segment. In either of the cases of FIGS. 3A and 3B, the functional spirit of interfaces 205 and 210 remain the same as with FIGS. 2A and 2B, respectively.

The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 4A:
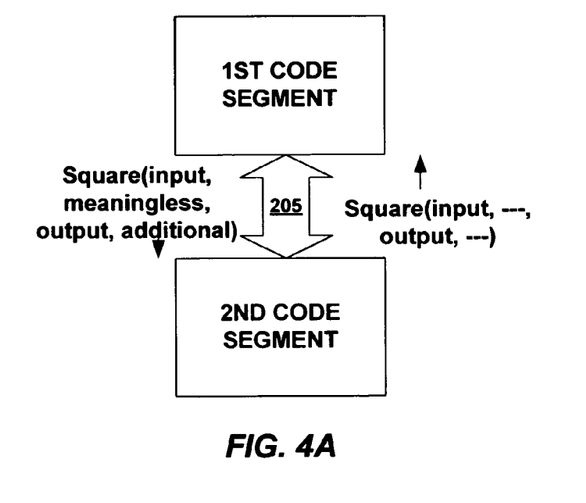
Figure 4B:
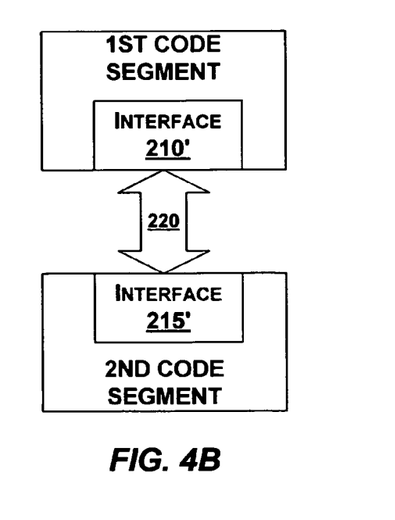

In some cases, it may be possible to ignore, add, or redefine certain aspects (e.g., parameters) of a programming interface while still accomplishing the intended result. This is illustrated in FIGS. 4A and 4B. For example, assume interface 205 of FIG. 2A includes a function call Square(input, precision, output), that includes three parameters, input, precision and output, and which is issued from the $1^{st}$ Code Segment to the $2^{nd}$ Code Segment. If the middle parameter precision is of no concern in a given scenario, as shown in FIG. 4A, it could just as well be ignored or even replaced with a meaningless (in this situation) parameter. An additional parameter of no concern may also be added. In either event, the functionality of square can be achieved, so long as output is returned after input is squared by the second code segment.

Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 4B, interface 210 is replaced by interface 210', redefined to ignore or add parameters to the interface. Interface 215 may similarly be redefined as interface 215', redefined to ignore unnecessary parameters, or parameters that may be processed elsewhere. As can be seen, in some cases a programming interface may include aspects, such as parameters, that are not needed for some purpose, and so they may be ignored or redefined, or processed elsewhere for other purposes.

C. Inline Coding

Figure 5A:
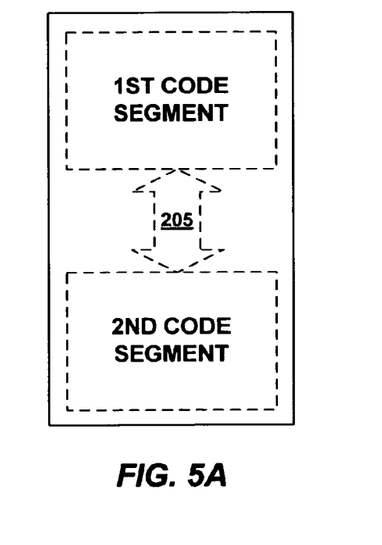
Figure 5B:
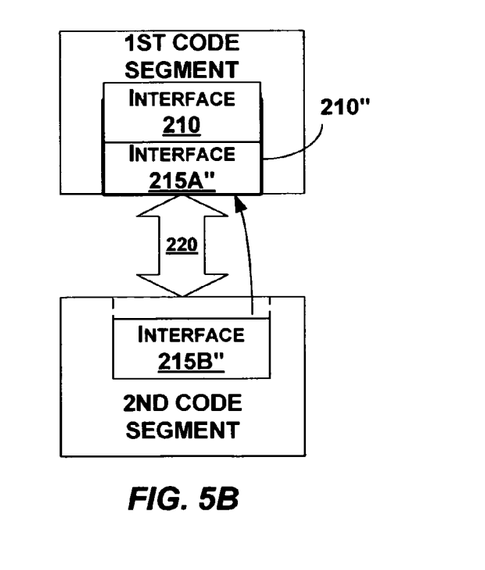

It may also be feasible to merge some or all of the functionality of two separate code modules such that the "interface" between them changes form. For example, the functionality of FIGS. 2A and 2B may be converted to the functionality of FIGS. 5A and 5B, respectively. In FIG. 5A, the previous $1^{st}$ and $2^{nd}$ Code Segments of FIG. 2A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface 205 may still be in effect. Similarly, shown in FIG. 5B, part (or all) of interface 215 from FIG. 2B may be written inline into interface 210 to form interface 210". As illustrated, interface 215 is divided into 215A" and 215B", and interface portion 215A" has been coded in-line with interface 210 to form interface 210".

For a concrete example, consider that the interface 210 from FIG. 2B may perform a function call square (input, output), which is received by interface 215, which after processing the value passed with input (to square it) by the second code segment, passes back the squared result with output. In such a case, the processing performed by the second code segment (squaring input) can be performed by the first code segment without a call to the interface.

D. Divorce

Figure 6A:
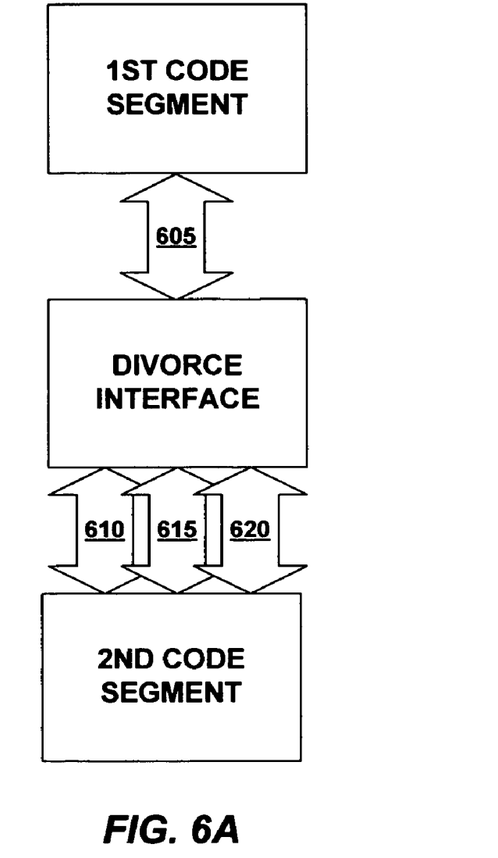

A communication from one code segment to another may be accomplished indirectly by breaking the communication into multiple discrete communications. This is depicted schematically in FIGS. 6A and 6B. As shown in FIG. 6A, one or more piece(s) of middleware (Divorce Interface(s), since they divorce functionality and/or interface functions from the original interface) are provided to convert the communications on the first interface 605, to conform them to a different interface, in this case interfaces 610, 615, and 620. This might be done, for example, where there is an installed base of applications designed to communicate with, say, an operating system in accordance with an the first interface 605's protocol, but then the operating system is changed to use a different interface, in this case interfaces 610, 615, and 620. It can be seen that the original interface used by the $2^{nd}$ Code Segment is changed such that it is no longer compatible with the interface used by the $1^{st}$ Code Segment, and so an intermediary is used to make the old and new interfaces compatible.

Figure 6B:
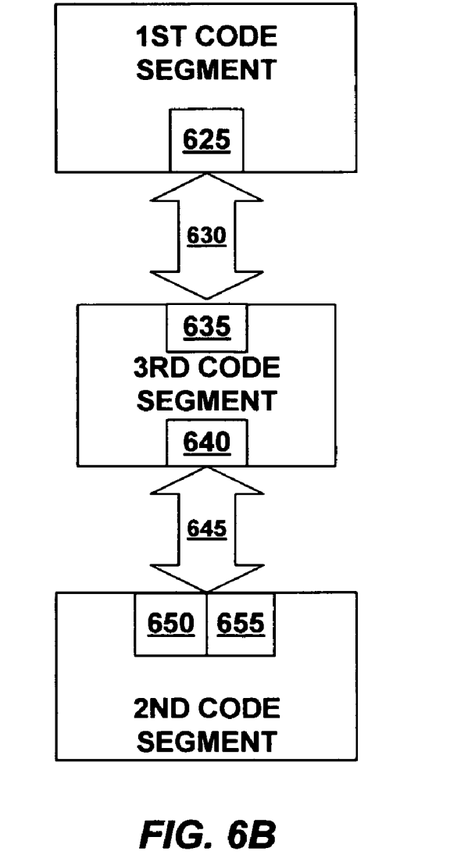

Similarly, as shown in FIG. 6B, a third code segment can be introduced with divorce interface 635 to receive the communications from interface 630 and with divorce interface 640 to transmit the interface functionality to, for example, interfaces 650 and 655, redesigned to work with 640, but to provide the same functional result. Similarly, 635 and 640 may work together to translate the functionality of interfaces 210 and 215 of FIG. 2B to a new operating system, while providing the same or similar functional result.

E. Rewriting

Yet another possible variant is to dynamically rewrite the code to replace the interface functionality with something else but which achieves the same overall result. For example, there may be a system in which a code segment presented in an intermediate language (e.g. Microsoft IL, Java® Byte-Code, etc.) is provided to a Just-in-Time (JIT) compiler or interpreter in an execution environment (such as that provided by the .Net framework, the Java® runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 7 and 8.

Figure 7:
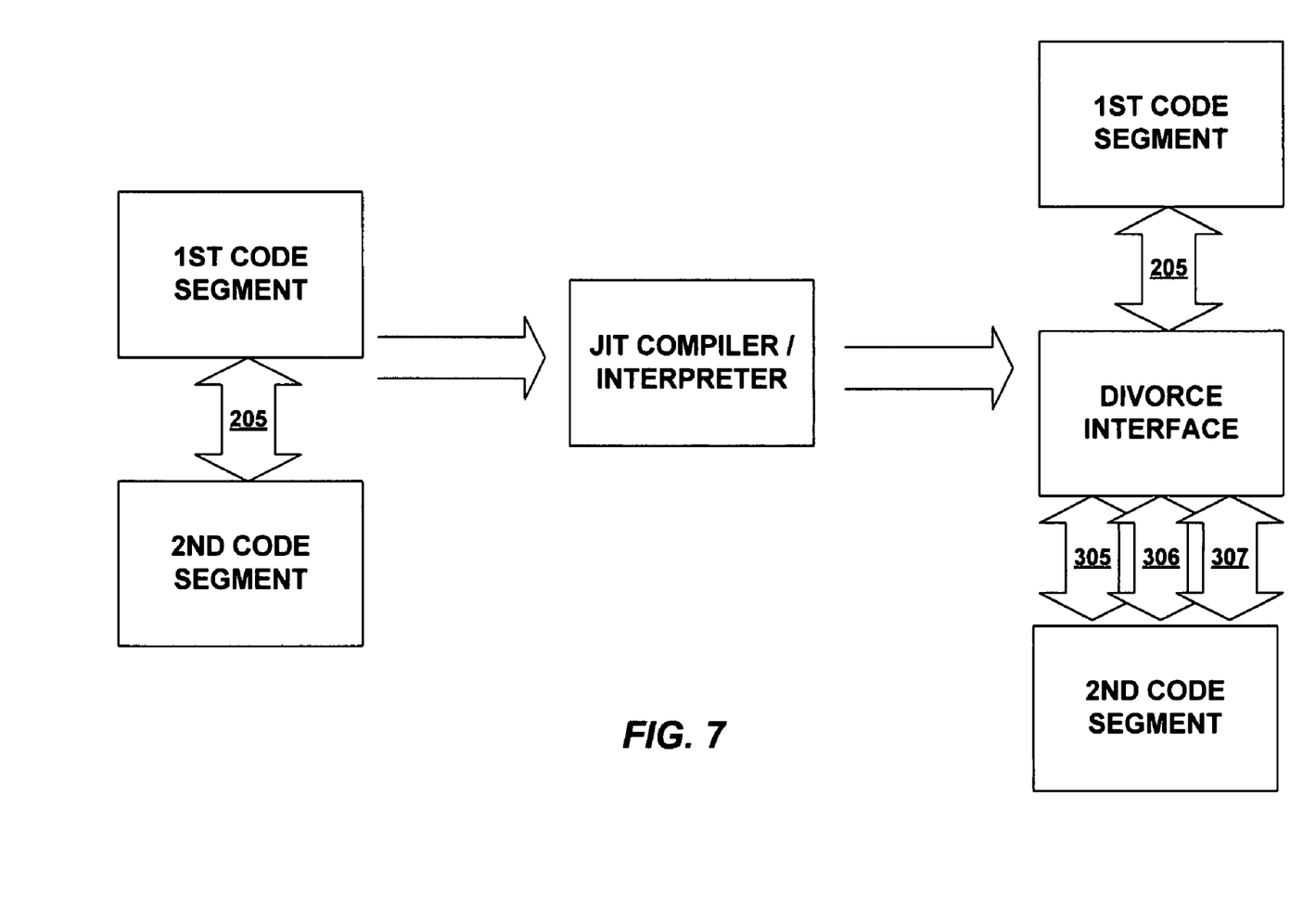
FIGS. 7 and 8 are block diagrams that generally represent how a compiler or interpreter may transform one or more interfaces to one or more other interfaces in accordance with aspects of the subject matter described herein.
Figure 8:
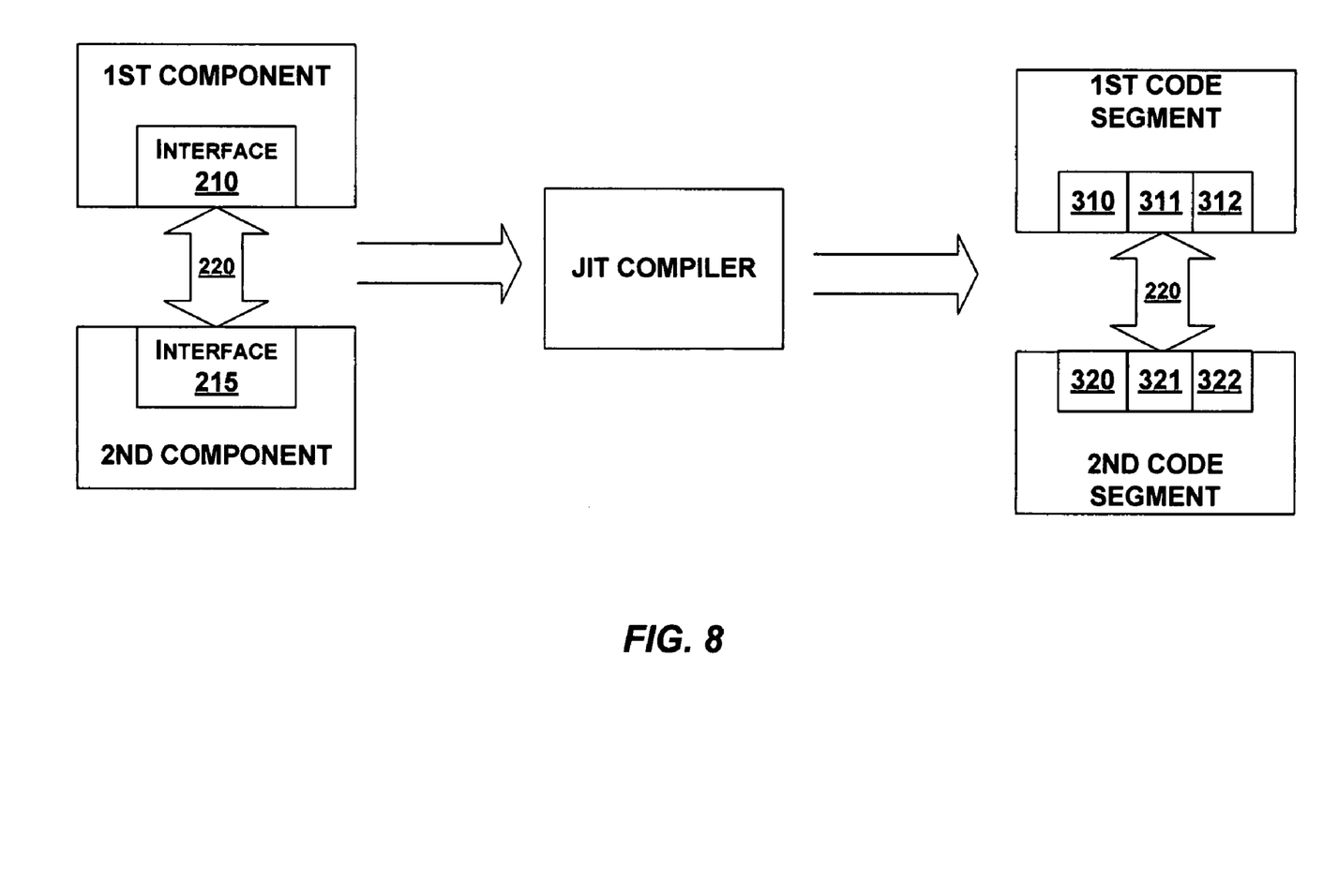

As can be seen in FIG. 7, this approach is similar to the Divorce scenario described above. It might be done, for example, where an installed base of applications are designed to communicate with an operating system in accordance with a first interface protocol, but then the operating system is changed to use a different interface. The JIT Compiler may be used to conform the communications on the fly from the installed-base applications to the new interface of the operating system. As depicted in FIG. 8, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched, and combined to produce the same or equivalent scenarios to the generic scenarios presented in FIGS. 2A and 2B. It is also noted that, as with most programming constructs, there are other similar ways of achieving the same or similar functionality of an interface which may not be described herein, but nonetheless are represented by the spirit and scope of the subject matter described herein, i.e., it is noted that it is at least partly the functionality represented by, and the advantageous results enabled by, an interface that underlie the value of an interface.

Commanding

Commands may be used in various scenarios. For example, commands may be used in editing to cut, copy, paste, add text attributes such as bold, italics, and underlining, and the like.

These commands may be generated from a variety of sources. For example, a cut command may be generated in response to selecting a cut command from a menu, entering a keyboard shortcut (e.g., [control]-x), a certain motion (e.g., flick) on a handheld device, a voice command, by other input devices, by other program code, and the like.

A command may mean different things when applied to different objects. For example, in a text box, a cut command may mean to cut the selected text while in a data grid with a selected row a cut command may mean to delete the entire row.

Figure 9:
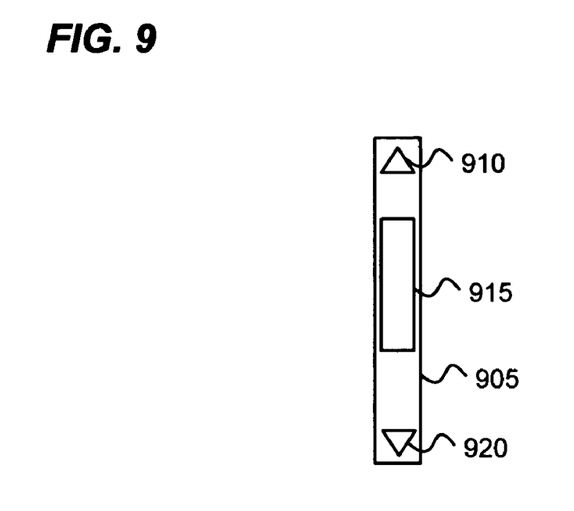
FIG. 9 is a block diagram representing a scroll bar control used as a control template in accordance with aspects of the subject matter described herein.

As another scenario, a command may be used in a control template. For example, in a scroll bar 905 as represented in FIG. 9, there may be a line up button 910, a line down button 920, and a track 915. A control template may allow a user or software developer to control the look and feel of the control without changing the functionality of the control. For example, in a markup language, a software or page developer may define a template for the scroll bar as:

```
<DockPanel>
<LineUpButton Command="LineUp"/>
<Track/>
<LineDownButton Command="LineDown" />
</DockPanel>
```

Whenever a button of the scroll bar 905 is activated the appropriate command is generated. The scroll bar 905 does not need to be aware of what actually generated the LineUp or LineDown command. For example, the command may have been generated by a user selecting one of the buttons 910 or 920, by voice recognition software, by keyboard input, and the like.

Another scenario in which a command may be used is when an application developer wishes to execute an action or method whenever an action or event occurs. The application developer may cause this to occur by associating the command with an event or action on a control-like button. For example, a file object may define a FileOpen and a FileEdit action. The FileOpen action may be executed when a user presses enter or double clicks on a selected item. Using a command may allow the application developer to separe UI logic from business logic, for example.

Commands may be implemented via an ICommand interface. An ICommand interface may include an Execute method and a CanExecute method. The Execute method may allow components to define actions to take when the command is executed. For example, if a cut command is executed while a text box has focus, a text box component may cut selected text into a buffer.

A command may need a parameter to perform its action. For example a FileOpen or Print command may need a file name to operate correctly. In one embodiment, the Execute method accepts parameters or a generic data of type object, where the consumer and creator of the command define what the parameters or generic data mean. If a command does not need parameters, it may disregard any passed parameters.

The CanExecute method indicates whether the command may execute. For example, if focus is set to a scroll bar, a cut command may not be able to execute. A component may call the CanExecute method to determine whether it may execute the Execute method. The CanExecute method may also accept parameters which may be ignored if not needed.

In addition, an event may be associated with the ICommand interface. The event may indicate when the execute capability of the command has changed or when an object instantiated in accordance with the ICommand interface should call CanExecute to determine whether it may still execute. The object may then enable or disable a visual element associated therewith to indicate its current capability to execute, for example.

An exemplary interface for implementing an ICommand interface comprises:

```
public interface ICommand
{
    void Execute(object params);
    bool CanExecute(object params);
    event CanExecuteChangedEvent CanExecuteChanged;
}
```

In this interface, ICommand.Execute defines the method which should be executed when the Command is executed, ICommand.CanExecute returns a Boolean and indicates whether the Command may be executed or not, and CanExecuteChangedEvent is raised by the Command, whenever its ability to execute changes.

An example of an object that may use the interface is a button on a form. The button may be associated with a submit command. When the button is clicked, it may be desired to submit information to a server, for example. To provide an indication as to whether this is allowed, the button may be enabled or disabled based on whether the information may be submitted at a particular point in time. For example, the information may or may not be able to be submitted based on whether all the data to submit is available (e.g., has been filled in on the form), whether a connection to the server is available, whether the form is connected to the server, and the like. If the connection to the server changes, the CanExecuteChangedEvent event may be raised so that the button may change its enabled/disabled state.

The button described above is an example of a CommandSource (hereinafter "CommandSource"). Generally, a CommandSource may include any element which is able to invoke a Command. Other exemplary CommandSources include other elements including MenuItem, ListBoxItem, Hyperlink, and other controls. An exemplary interface of a CommandSource class comprises:

```
Public class CommandSource
{
    ICommand Command;
    Object CommandParameter;
    IInputElement CommandTarget;
}
```

A CommandSource may invoke a Command by calling ICommand.Execute whenever the CommandSource is invoked. A CommandSource may define what it means to be invoked. For example, a CommandSource such as a button may invoke the Command when the button is clicked. The CommandSource may also pass the ICommand.Execute method a value of the CommandSource's CommandParameter.

In addition, a CommandSource may enable or disable itself based on the CanExecute state on the Command. To do so, the CommandSource may invoke the ICommand.CanExecute method and pass it a value of a CommandParameter. The CommandSource may then use the boolean returned to set the CommandSource's state to enabled or disabled.

A CommandSource may also register for the ICommand.CanExecuteChangedEvent and may then re-invoke the ICommand.CanExecute method each time the CommandSource receives a CanExecuteChangedEvent. Based on the value returned from the ICommand.CanExecute, a CommandSource may update its enabled or disabled state accordingly.

Another example of an object that may be used to invoke a Command is an InputBinding object (hereinafter "InputBinding"). An InputBinding associates input with a command. As described below and subject to certain conditions, when the input identified by the InputBinding is received, the command is generated. As mentioned previously, input may come from many sources including a keyboard, a stylus, a mouse, voice input, and the like. An exemplary class definition of an InputBinding class comprises:

```
public class InputBinding
{
    public virtual InputGesture Gesture {get;set;}
    public ICommand        Command {get;set;}
    public object Parameter {get; set;}
    public IInputElement Target;
}
```

An InputGesture object (hereinafter "InputGesture") defines a set of one or more events of event, such as a mouse click, stylus flick, or keyboard input, to which the InputGesture wants to listen. This set may be defined in using an InputEvents property of the InputGesture. Event listeners corresponding to the events may be registered so that an InputGesture object is notified when any of the events occurs.

An InputGesture may also define a Matches method which accepts InputEventArgs and returns a value that indicates whether the InputEventsArgs match the set of events associated with the InputGesture.

In addition, a ValidateCallback method may be provided by a subclass of the InputGesture class. The VallidateCallback may be called when an event is received to determine if valid arguments have been received before checking all possible InputBindings corresponding to the InputGesture for a match. The InputGesture class may serve as a parent class for more specific types of InputGesture (e.g., mouse, keyboard, stylus, and so forth).

An exemplary interface for an InputGesture class comprises:

```
public class InputGesture
{
    protected RoutedEventeventCollection InputEvents;
    public virtual bool Matches(InputEventArgs args);
    protected static virtual ValidateInput (InputEventArgs args);
}
```

An InputBinding associates an InputGesture with a command. For example, an InputBinding object may associate [control]-c with a "copy" command. Another InputBinding object may associate a flick of a stylus with a "cut" command. Each time an InputBinding object obtains an InputGesture (as indicated by an appropriate set of events), the associated command may be executed. The InputBinding class may serve as a parent class for more specific types of InputBinding (e.g., mouse, keyboard, stylus, and so forth).

Figure 10:
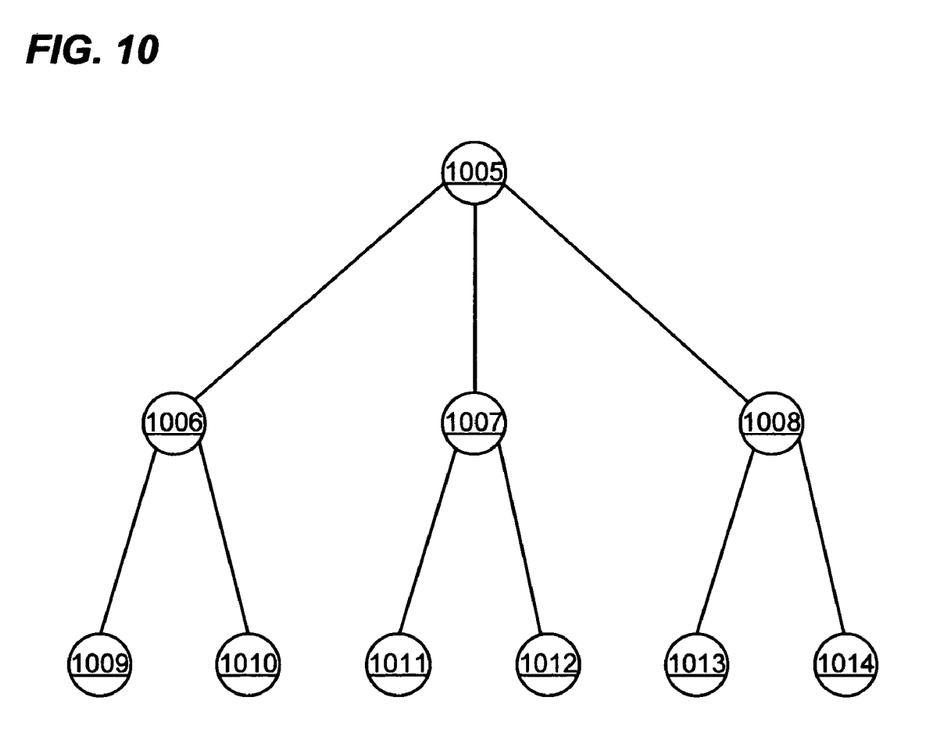
FIG. 10 is a block diagram generally representing a visual tree in accordance with aspects of the subject matter described herein.

FIG. 10 is a block diagram generally representing a visual tree in accordance with aspects of the subject matter described herein. A graphics framework (such as one described in conjunction with FIG. 12) may use a visual tree to display visual elements. The visual tree may include visual elements 1005-1014 which represent elements to display. Such elements may include windows, grids, list boxes, combo boxes, buttons, text, graphics, panels, and the like. Some elements in the visual tree may include other elements in the visual tree. For example, a window element may include panels and grids. As another example, a button element may include a text element and a rectangle element. In some senses, a visual tree may be thought of as one form of a hierarchical data structure.

As mentioned previously, an InputBinding generates a command when input specified by the InputBinding (e.g., an InputGesture) is received. In general, an element may have a collection (i.e., zero, one, or more) of InputBindings associated with it. These InputBindings are sometimes referred to as "instance" InputBindings. In addition, an InputBinding may be registered at a class level and at a global level.

Figure 11:
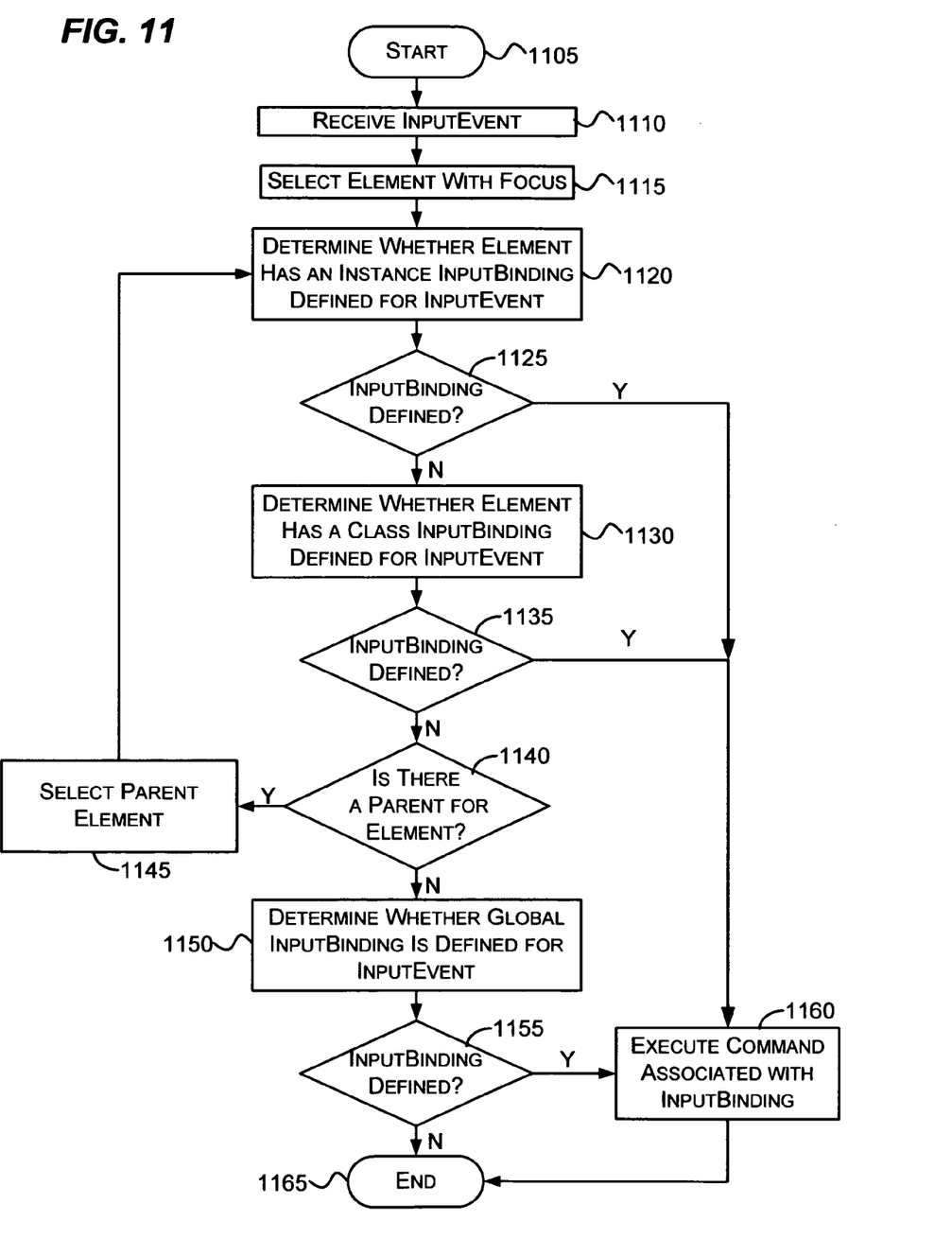
FIG. 11 is a flow diagram that generally represent actions that may occur in generating a command in response to receiving an InputEvent in accordance with aspects of the subject matter described herein.

FIG. 11 is a flow diagram that generally represent actions that may occur in generating a command in response to receiving an InputEvent in accordance with aspects of the subject matter described herein. At block 1105, the actions start.

At block 1110, an InputEvent is received. For example, a key on a keyboard is pressed or a mouse button is pressed. At block 1110, the element with focus is selected. For example, if the InputEvent was received while a textbox had focus, the textbox is selected.

At block 1120, a determination is made as to whether the element has an instance InputBinding defined for the InputEvent. At block 1125, if the element has an InputBinding defined for the InputEvent, the actions continue at block 1160; otherwise, the actions continue at block 1130.

At block 1130, a determination is made as to whether the element has a class InputBinding defined for the InputEvent. At block 1135, if the element has a class InputBinding defined for the InputEvent, the actions continue at block 1160; otherwise, the actions continue at block 1140.

In some implementations, if a class InputBinding is not defined for the InputEvent, the InputEvent may be sent as input to the element. The element may be "listening" for a sequence of key strokes or other input. If the element is listening for such input and handles the input, the actions stop; otherwise, the actions continue at block 1140.

At block 1140 a determination is made as to whether a parent element exists for the current element. If so, the actions continue at block 1145; otherwise, the actions continue at block 1150.

At block 1145, the parent element is selected (e.g., by raising the InputEvent on the parent element). The actions associated with blocks 1120-1140 may then repeat until an ancestor includes an instance or class InputBinding defined for the InputEvent or until no ancestor is found that includes such an InputBinding.

If no instance or class InputBinding is found, then at block 1150 a determination is made as to whether a global InputBinding is defined for the InputEvent. At block 1155, if a global InputBinding is defined for the InputEvent, the actions continue at block 1160; otherwise, the actions continue at block 1165.

At block 1160, the command associated with the found InputBinding is executed. At block 1165, the actions end.

It will be recognized that the above actions provide great flexibility with respect to generating commands. For example, a global command may be registered which may be overridden by a class command which may be further overridden by an instance command.

A RoutedCommand object (hereinafter "RoutedCommand") may be used to route a command via a visual tree or other data structure to an element that handles the command. A RoutedCommand may be used, for example, with commands such as cut, copy, paste, and the like, where the target of the command changes with focus.

A RoutedCommand may route a command by raising an event on a particular target element or by raising an event on an element that has focus when the command occurs. If the element is bound to the command (e.g., through a CommandBinding as described below), then the handler defined by the CommandBinding may be called to handle the command. If the element is not bound to the command, an event may be raised on a parent of the element. If the parent of the element is bound to the command, the handler defined by the CommandBinding for the parent element handles the command. If the parent of the element is not bound to the command, an event may be raised on its parent, and so forth. Eventually, an element is found that is bound to the command or the command reaches the top of the visual tree without being handled by any element.

In some implementations, class and global CommandBindings may be registered and used. In such implementations, selecting an appropriate CommandBinding may proceed in a manner similar to that described in conjunction with FIG. 11 with respect to InputBindings.

A CommandBinding object (hereinafter "CommandBinding") defines an association between a RoutedCommand and the delegates (e.g., methods) to call in the event handlers associated with the events for that RoutedCommand. When a Command object is executed, it may fire the PreviewCommandExecuteEvent and the CommandExecuteEvent on the focused element and pass the Command as a parameter. Similarly, when the Command's IsEnabled method is called, it may invoke the CommandQueryEnabled and PreviewCommandQueryEnabledEvent on the focused element. An exemplary definition of a CommandBinding class comprises:

```
public class CommandBinding
{
    //constructors
    public CommandBinding( );
    public CommandBinding(RoutedCommand cmd);
    //properties and events
    public RoutedCommand           Command            {get;set;}
    public ExecuteEventHandler     Execute            {get;set;}
    public CanExecuteEventHandler  CanExecute         {get;set;}
    public ExecuteEventHandler     PreviewExecute     {get;set;}
    public CanExecuteEventHandler  PreviewCanExecute  {get;set;}
}
```

Figure 12:
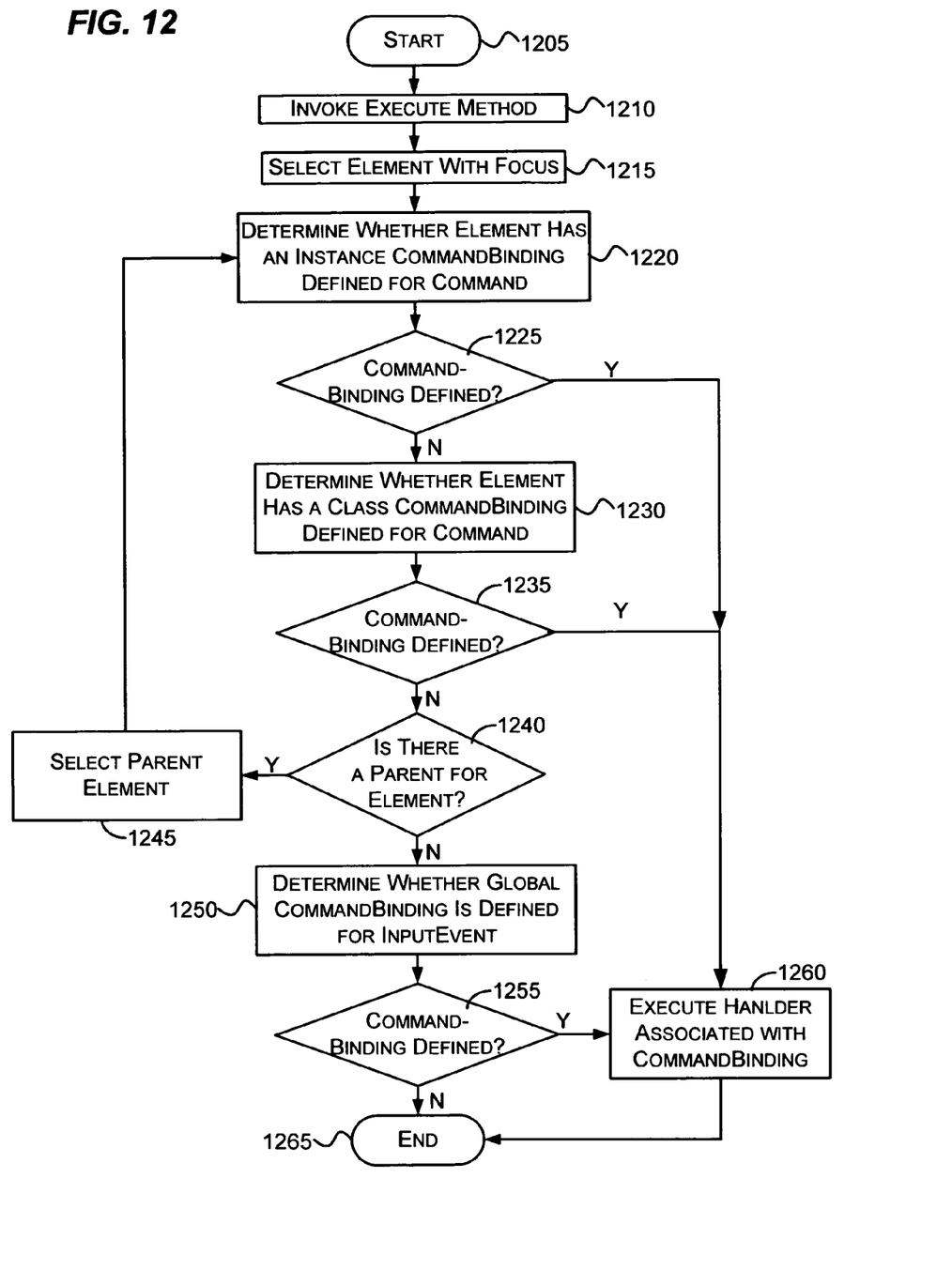
FIG. 12 is a flow diagram that generally represents actions that may occur in executing actions associated with a command in accordance with aspects of the subject matter described herein.

FIG. 12 is a flow diagram that generally represents actions that may occur in executing actions associated with a command in accordance with aspects of the subject matter described herein. At block 1205, the actions start.

At block 1210, an Execute method is invoked. For example, a user presses a button on a form. At block 1210, the element with focus is selected. If the command is associated with a targeted element, that element is selected. For example, if the Execute method associated with a targeted textbox was invoked, the textbox is selected.

At block 1220, a determination is made as to whether the element has an instance CommandBinding defined for the Command. At block 1225, if the element has a CommandBinding defined for the Command, the actions continue at block 1260; otherwise, the actions continue at block 1230.

At block 1230, a determination is made as to whether the element has a class CommandBinding defined for the Command. At block 1235, if the element has a class CommandBinding defined for the Command, the actions continue at block 1260; otherwise, the actions continue at block 1240.

At block 1240 a determination is made as to whether a parent element exists for the current element. If so, the actions continue at block 1245; otherwise, the actions continue at block 1250.

At block 1245, the parent element is selected (e.g., by raising an event on the parent element). The actions associated with blocks 1220-1240 may then repeat until an ancestor includes an instance or class CommandBinding defined for the Command or until no ancestor is found that includes such a CommandBinding.

If no instance or class CommandBinding is found, then at block 1250 a determination is made as to whether a global CommandBinding is defined for the Command. At block 1255, if a global CommandBinding is defined for the Command, the actions continue at block 1260; otherwise, the actions continue at block 1265.

At block 1260, the handler identified by the found CommandBinding is executed. At block 1265, the actions end.

In addition, CanExecute queries may be handled through the same mechanism as the RoutedCommand. For example, if an element includes a CanExecute method, then that element's CanExecute method is called when the element is in focus. If not, a search is made of the element's ancestors to find a CanExecute method. In executing a CanExecute query, a RoutedCommand may raise a CanExecuteEvent on either the element with focus or a selected element. An exemplary interface for RoutedCommand may comprise:

```
public class RoutedCommand : ICommand
{
    Execute(object param);
    Execute(IInputElement target, object param);
    CanExecute(object params);
    CanExecute(IInputElement target, object param);
    event CanExecuteChangedEvent CanExecuteChanged;
}
```

Note that the InputElement target allows an application developer to directly target the RoutedCommand to a specific element instead of the focused element. This may be useful, for example, when the application developer wants a button to always execute a "submit" command on the textbox next to the button or perform some other specific behavior.

Furthermore, a RoutedCommand may listen for a RequerySuggested event. A RequerySuggested event may occur for many reasons. For example, when the focus is set to selected text in a textbox, cut, copy, and paste commands (and associated buttons, menu items, and the like) may need to be enabled. When the focus is set to a scroll bar, however, these buttons and controls may need to be disabled as cut, copy, and paste may not be applicable. The RequerySuggested event may thus be raised on one or more elements each time focus changes as one example.

When a RequerySuggested event is received, a RoutedCommand may then raise a CanExecuteChangedEvent to which a CommandSource listens. The CommandSource may then calls its CanExecute method to update its state.

RoutedCommands may also include an IsRMEnabled property. If the IsRMEnabled property is set to False, then an element may be prevented from becoming enabled even if CanExecute is True. This may be used, for example, to work with Digital Rights Management (DRM) systems in which rights to perform various commands may be restricted.

A RoutedProperty may allow an application developer to define properties which may not be able to be directly defined on a target as the target changes with focus. For example, a toolbar may include toolbar items such as bold, italics, underlining, and the like. In addition, the toolbar may be associated with a textbox and text may be selected from the textbox. When the bold toolbar item is selected, for example, the bolding of the selected text may be toggled. The bold toolbar item may be enabled if the selected text supports bold. In addition, the toolbar items may display current state as to whether the selected text includes attributes (e.g., bolding, italics, underlining) associated with the toolbar items.

An exemplary interface for a RoutedProperty comprises:

```
public class RoutedProperty : INotifyPropertyChanged
{
    public object Value{get;set;}
    public bool CanGetValue{get;}
    //events
    internal static RoutedEventID GetValueEvent;
    internal static RoutedEventID SetValueEvent;
    internal static RoutedEventID CanGetValueEvent;
}
```

An element associated with a RoutedProperty may set its enabled/disabled state by using the mechanism described previously with respect to Commands and RoutedCommands. In addition, a RoutedProperty may be used to obtain the current value of an element with focus so that it may display its state accordingly. This value may be obtained by firing a GetValueEvent on the focused element which returns a value. A RoutedProperty may also be used to set the current value of an element with focus (e.g., from bold to normal) via a Command, for example. This value may be set by firing a SetValueEvent on the focused element and passing a parameter of the value to which to set the value. These events may propagate in the same manner as described in conjunction with RoutedCommands as described above.

Figure 13:
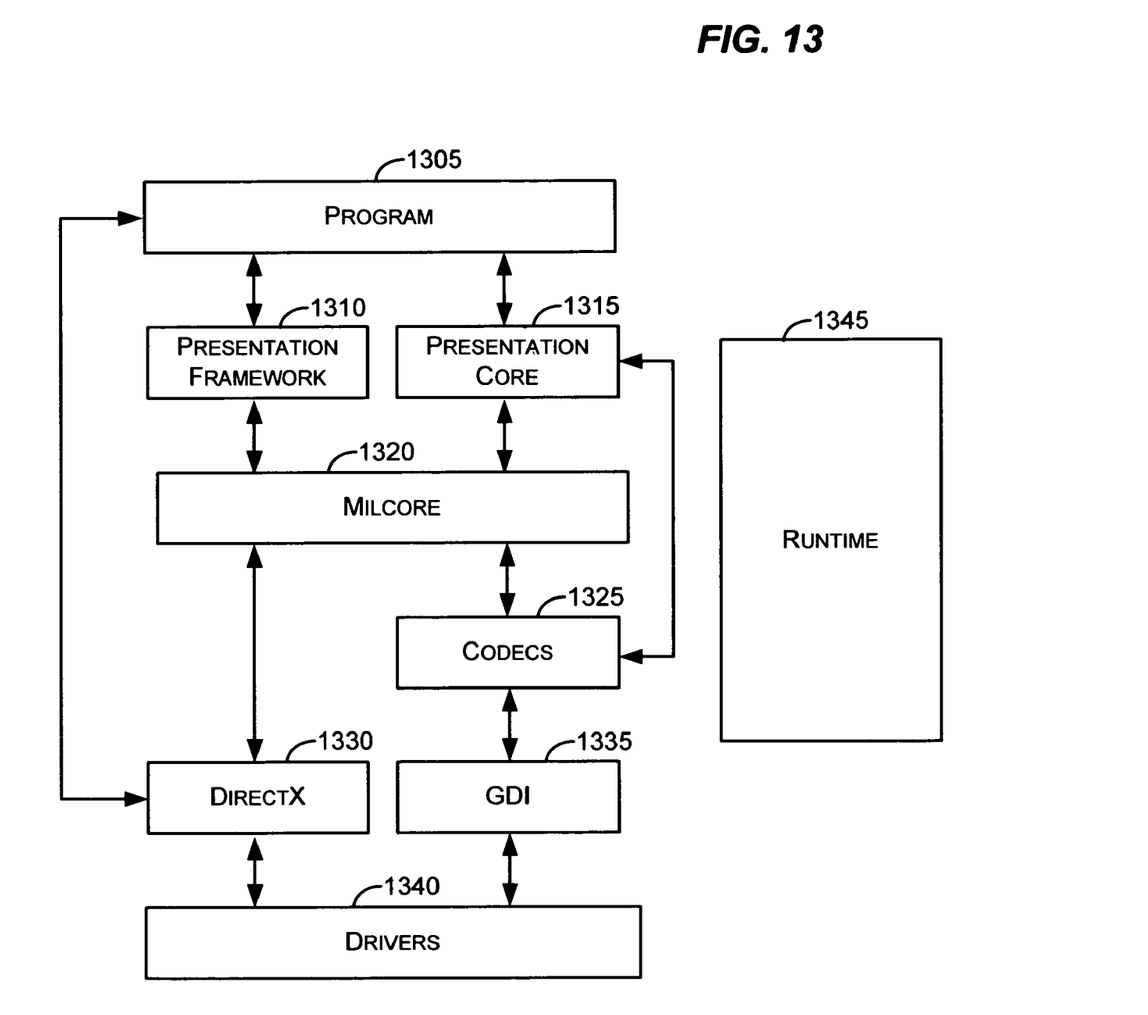
FIG. 13 is a block diagram that generally represents an environment in which aspects of the subject matter described herein may operate.

FIG. 13 is a block diagram that generally represents an environment in which aspects of the subject matter described herein may operate. The environment may include a program 1305, a presentation framework 1310, a presentation core 1315, a milcore 1320, a runtime component 1345, a codecs component 1325, a DirectX component 1330, a graphics device interface (GDI) 1335, drivers 1340, and runtime module 1345.

The presentation framework 1310 is exposed to software developers and includes APIs by which various requests may be made. Top level objects of a graphics framework, such as buttons, list boxes, combo boxes, scroll bars, splitters, and the like, may reside in the presentation framework 1310.

The presentation core 1315 is also exposed to software developers through APIs by which various requests may be made. Interfaces described previously may be exposed through the presentation core 1315. The properties of a top level object of a graphics framework, such as an ImageSource object, brushes, pens, shapes, animation support, text, and the like, may reside in the presentation core 1315 or the presentation framework 1310.

The milcore 1320 implements functionality provided by the APIs of the presentation framework 1310 and the presentation core 1315. The milcore 1320 may be accessed by the presentation core 1315 and the presentation framework 1310.

The runtime component 1345 may provide an environment for running intermediate language created from one or more programming languages. For example, the runtime component may be used to execute intermediate language created from code that implements the presentation core 1315, the presentation framework 1310, and the program 1305.

The codecs 1325 may be used by the presentation core 1315 and the milcore 1320 for imaging tasks such as encoding and decoding images.

The DirectX component 1330 may provide APIs to enable a software developer to access specialized hardware features (such as video and sound hardware features) without having to write hardware-specific code. The program 1305 and milcore 1320 may use the DirectX component 1330 to access the features.

The GDI 1335 allows processes to display graphics and formatted text on a video display and may interact with device drivers that display graphics and formatted text on behalf of such processes.

The drivers 1340 may be used to interface with hardware while the runtime 1345 may be used to execute intermediate code generated from various programming languages.

Although some lines have been drawn between various components of the environment of FIG. 13 to represent the capacity to communicate between these components, more, fewer, or other communication paths may exist without departing from the spirit or scope of the subject matter described herein. Furthermore, while various components of the environment have been described, it will be recognized that more, fewer, or other components may be used or configured in other configurations without departing from the spirit or scope of the subject matter described herein.

It will be recognized that aspects of the subject matter described herein may be used to abstract input, abstract implementation. This allows application developers to more easily create menus, toolbars, and other UI elements. For example, an application developer may more easily create a menu or toolbar by associating menu items or toolbar items with commands in a markup language. Furthermore, a command library may be created that defines standard commands (e.g., cut, copy, paste, and so forth). Because the implementation is abstracted, when a command is issued, the appropriate handler for an element or its ancestors is automatically called.

As can be seen from the foregoing detailed description, aspects have been described related to user interfaces. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. At least one computer-readable medium containing instructions which when executed by a computer, perform actions, comprising:
   at an interface, receiving an instruction to execute a command;
   in response thereto, attempting to find a command binding object associated with the command by traversing a hierarchical data structure;
   determining that a first, higher-level command binding object is associated with the command, the first higher-level command binding object including binding information that associates the command to a first instruction;
   determining that a second, lower-level command binding object is also associated with the command, the second lower-level command binding object including binding information that associates the command to a second, different instruction; and
   overriding the binding information of the first, higher-level command binding object with the binding information of the second, lower-level command binding object, such that the binding information of the second, lower-level command binding object is used.

2. The at least one computer-readable medium of claim 1, wherein attempting to find an object associated with the command by traversing a hierarchical data structure comprises selecting an element with focus and determining whether a command binding object associates the element with the command.

3. The at least one computer-readable medium of claim 2, wherein attempting to find an object associated with the command by traversing a hierarchical data structure further comprises selecting an ancestor of the element with focus and determining whether a command binding object associates the ancestor with the command.

4. The at least one computer-readable medium of claim 2, wherein attempting to find an object associated with the command by traversing a hierarchical data structure further comprises determining whether a command binding object associates a class that includes the element with the command.

5. The at least one computer-readable medium of claim 2, wherein attempting to find an object associated with the command by traversing a hierarchical data structure further comprises determining whether a global command binding object is associated with the command.

6. The computer-readable medium of claim 2, wherein the hierarchical data structure comprises a visual tree including relationships between a plurality of elements, and wherein each of the elements is representable in a graphical user interface.

7. At least one computer-readable medium containing instructions which when executed by a computer, perform actions, comprising:
   at an interface, receiving an input event;
   in response thereto, determining whether an element represented in a graphical user interface has an instance class binding defined for the input event;
   determining that a class command binding object is associated with the command, the class command binding object including binding information that associates the command to a class instruction;
   determining that the instance command binding object is also associated with the command, the instance command binding object including binding information that associates the command to an instance instruction; and
   overriding the binding information of the class command binding object with the binding information of the instance command binding object, such that the binding information of the instance command binding object is used.

8. The at least one computer-readable medium of claim 7, further comprising in response to the input event, determining whether the element has a class input binding defined for the input event, wherein the class input binding defines methods to call for elements having a type of the class input binding.

9. The at least one computer-readable medium of claim 8, further comprising in response to the input event determining whether a parent of the element has an instance input binding defined for the input event.

10. The at least one computer-readable medium of claim 9, wherein if no ancestor of the element has an instance or class input binding defined for the input event, determining whether a global input binding defined for the input event.

11. The at least one computer-readable medium of claim 7, wherein the input event is generated in response to an input source, wherein the input source is comprised of at least a keyboard, a mouse, a stylus, or a microphone for capturing voice commands.

12. The at least one computer-readable medium of claim 7, wherein if the element has an input binding associated with the input event, executing a command associated with the input binding.

13. The at least one computer-readable medium of claim 12, wherein executing a command associated with the input binding comprises searching a visual tree of elements having a visual representation for an element having a command binding associating the command with a handler.

14. The at least one computer-readable medium of claim 7, wherein the input binding associates an input gesture with a command, wherein the input gesture is associated with a set of one or more events, wherein the input gesture is notified if any of the one or more events occur.

15. In a computing environment, a method, comprising:
   receiving an input event;
   selecting an visual element to which to direct the input event;
   determining whether the visual element includes a binding object including binding information that associates an input gesture including the input event with a command;
   determining that a first, higher-level command binding object is associated with the command, the first higher-level command binding object including binding information that associates the command to a first instruction;
   determining that a second, lower-level command binding object is also associated with the command, the second lower-level conunand binding object including binding information that associates the command to a second, different instruction;
   routing the command to the second, different instruction using a route command, the route command allowing commands to be used on command targets that change with focus; and
   overriding the binding information of the first, higher-level command binding object with the binding information of the second, lower-level command binding object, such that the binding infonnation of the second, lower-level command binding object is used.

16. The method of claim 15, further comprising if the visual elements does not include a binding that associates the input gesture with the command, determining whether the element is associated with a class binding that associates the input gesture with a command.

17. The method of claim 16, further comprising determining whether a binding of a parent of the visual elements associates the input gesture with a command.

18. The method of claim 15, further comprising executing the command via a routed command object, wherein the routed command object is used to search a hierarchical data structure to find an element having a method associated with the command.

19. The at least one computer-readable medium of claim 7, wherein determining whether an element represented in a graphical user interface has an instance binding defined for the input event comprises selecting an element with focus and determining whether a command binding object associates the element with the command.

20. The at least one computer-readable medium of claim 19, wherein determining whether an element represented in a graphical user interface has an instance binding defined for the input event further comprises selecting an ancestor of the element with focus and determining whether a command binding object associates the ancestor with the command.

* * * * *